(12) United States Patent
Dockter et al.

(10) Patent No.: US 7,693,617 B2
(45) Date of Patent: Apr. 6, 2010

(54) AIRCRAFT PRECISION APPROACH CONTROL

(75) Inventors: Gregory E. Dockter, Mesa, AZ (US);
Donald G. Caldwell, Mesa, AZ (US);
Jason Graham, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 732 days.

(21) Appl. No.: 11/533,226

(22) Filed: Sep. 19, 2006

(65) Prior Publication Data
US 2008/0071431 A1    Mar. 20, 2008

(51) Int. Cl.
*G05D 1/06* (2006.01)
*G06F 19/00* (2006.01)

(52) U.S. Cl. .............................. 701/3; 701/24; 701/28; 244/158.4; 340/989

(58) Field of Classification Search ................. 701/3, 701/4, 10, 16, 18, 23, 24, 26, 28, 213, 214, 701/217; 244/158.4, 17.13; 340/901, 989
See application file for complete search history.

(56) References Cited

U.S. PATENT DOCUMENTS

| | | | |
|---|---|---|---|
| 1,963,826 A | | 6/1934 | Chilton |
| 3,705,955 A | | 12/1972 | Assouline et al. |
| 4,386,848 A | * | 6/1983 | Clendenin et al. .......... 356/5.01 |
| 4,792,904 A | | 12/1988 | Reinagel et al. |
| 5,465,142 A | * | 11/1995 | Krumes et al. ............. 356/5.01 |
| 6,012,001 A | * | 1/2000 | Scully .......................... 701/16 |
| 6,181,271 B1 | * | 1/2001 | Hosaka et al. ................ 342/33 |
| 6,559,933 B1 | * | 5/2003 | Kirkpatrick et al. ........ 356/28.5 |
| 6,694,228 B2 | * | 2/2004 | Rios ............................. 701/2 |
| 6,952,632 B2 | | 10/2005 | Henry et al. |
| 7,184,072 B1 | * | 2/2007 | Loewen et al. ............. 348/144 |
| 7,228,232 B2 | * | 6/2007 | Bodin et al. ................ 701/301 |
| 7,373,242 B2 | * | 5/2008 | Yamane ...................... 701/200 |
| 7,400,950 B2 | * | 7/2008 | Reich ............................ 701/3 |
| 7,456,847 B2 | * | 11/2008 | Krajec ........................ 345/629 |
| 2004/0263852 A1 | * | 12/2004 | Degtiarev et al. ........... 356/437 |

FOREIGN PATENT DOCUMENTS

| FR | 2727082 | 5/2006 |
|---|---|---|
| GB | 2224613 | 5/1990 |

* cited by examiner

*Primary Examiner*—Tan Q. Nguyen
(74) *Attorney, Agent, or Firm*—Haynes & Boone, LLP.

(57) ABSTRACT

An aircraft control system for operations close to the ground includes a camera having a rangefinder for measuring the azimuth, elevation and slant range from a fixed point on the aircraft relative to a selected target point on a surface below the aircraft, a navigation system for measuring the latitude and longitude of the aircraft on the surface, a computer for computing the position of the fixed point on the aircraft relative to the target point from the respective measurements of the camera and the navigation system, and a controller for controlling the movement of the aircraft such that the fixed point is positioned at a selected position above the selected target point on the surface. The controller may also include an automatic tracking mechanism for maintaining the position of the fixed point on the aircraft at the selected position above a moving object.

23 Claims, 4 Drawing Sheets

AIRCRAFT PRECISION APPROACH CONTROL

BACKGROUND

The present disclosure relates to aircraft guidance and control systems, in general, and in particular, to a command and control approach system that enables a manned or unmanned aircraft operating close to the ground or the deck of a moving ship to safely and precisely drop off or pick up an external cargo load that blocks the aircraft's direct, line-of-sight (LOS) sensors to the ground or ship.

In a low-speed, external cargo-hook operation of a helicopter, it is difficult to obtain an accurate above-ground-level (AGL) altitude because the cargo load typically interferes with the usual AGL altitude sensors of the vehicle. Such sensors, including Radar Altitude, Ultrasonic Altitude and Laser Altitude sensors, all provide relatively accurate AGL altitude, but need a direct, line-of-sight path to the ground to determine the distance between, e.g., a cargo hook or the wheels or skids of the helicopter and the ground.

This problem is more exacerbated when operating an unmanned helicopter or other lowspeed aerial vehicle, such as an unmanned aerial vehicle (UAV) with low speed or hovering capabilities, close to the ground, and either with or without an external cargo load. A number of problems can arise when carrying a cargo load with a manned or unmanned helicopter.

First, and most important, is that the system controlling the helicopter must know the precise location of the ground relative to the vehicle when the latter is operating very close to it. When carrying an external cargo load, conventional AGL altitude sensors do not work well because the load often obscures their view of the ground. This interference causes the conventional altitude sensors to indicate height above the load, rather than height above the ground. This renders conventional AGL altitude sensors relatively useless for any flight control system when operating close to the ground with an external load. Other altitude information sources, such as Barometric Altitude or GPS altitude, when coupled with a terrain data base, can be used to provide AGL altitude estimates, but these sources have errors that are sufficiently large that they cannot be relied upon for near-Earth operations. Additionally, it is difficult to locate AGL altitude sensors aboard an aircraft such that external loads will not interfere under all conditions.

A second problem is in providing a convenient and efficient command and control mechanism at a remote ground station for operating an unmanned helicopter relative to a load to be picked up from or dropped off onto a landing zone. The remote ground station operator must be able to position the helicopter precisely over the load to be picked up, and conversely, to be able to drop the load off at a precise location on the ground.

A third problem is in providing a redundant source of AGL altitude for an unmanned helicopter when operating close to the ground, even when it not carrying an external cargo load. Typically, a radar altimeter is used for low altitude operations, and it is of primary importance for a helicopter to have AGL altitude to effect precision operations and landings. If the radar altimeter is the only source of AGL altitude, the loss of this sensor becomes very critical with respect to the aircraft's flight operations. A radar altimeter failure during an approach, while hovering, or when landing, could result in severe damage to or loss of the vehicle. Thus, a redundant, independent and precise AGL altitude source would greatly reduce the probability of such an occurrence.

Another problem relates to helicopter operations carried out on or near a moving platform, such as the deck of a ship. Continuous, precise position and velocity updates of a moving ship are needed for feedback to the helicopter's control system to enable it to accurately maintain the position and velocity of the helicopter relative to a landing, pickup or drop-off zone on a moving ship.

BRIEF SUMMARY

In accordance with the exemplary embodiments thereof described herein, the present invention provides a command and approach control system for a manned or unmanned helicopter or other aerial vehicle that overcomes the above and other problems of the prior art.

In one exemplary embodiment thereof, the command and control system comprises a camera, including a rangefinder, disposed aboard the aircraft for measuring an azimuth angle, an elevation angle and a slant range, or line-of-sight (LOS) distance from a fixed point on the aircraft, e.g., the aircraft's center of gravity (CG), landing gear, or a cargo hook disposed thereon, relative to a selected target point on a surface located below the aircraft, a navigation system, such as a Global Positioning Satellite (GPS) system or an Inertial Navigation System (INS), or both, disposed aboard the aircraft for measuring the latitude and longitude of a point on the surface that is disposed directly below the fixed point on the aircraft, a computer for computing the position of the fixed point on the aircraft relative to the target point from the respective measurements of the camera and the navigation system, and a controller for controlling the movement of the aircraft such that the fixed point on the aircraft is positioned at a selected azimuth angle, elevation angle and distance above the selected target point on the surface.

The controller of the exemplary system may further include an automatic tracking mechanism for maintaining the position of the fixed point on the aircraft at the selected azimuth angle, elevation angle and distance above an object that is moving over the surface, such as a car or a marine vessel.

In an exemplary preferred embodiment, the rangefinder of the camera comprises a laser rangefinder, and the camera is supported on a pair of gimbals respectively incorporating angular-measurement mechanisms, such as angle encoders, which are used to measure the azimuth and elevation angles to the target point.

The aircraft can comprise a helicopter or an aerial vehicle that is piloted by an onboard pilot, or alternatively, can be unmanned, and controlled by an operator located at a remote ground control station. In the case of an unmanned aircraft, the system may further include a Graphical User Interface display that is useable by a remote operator of the aircraft for controlling the position of the aircraft relative to the target point.

The selected target point may comprise a landing zone on the ground, or a load of cargo disposed thereon, or an object that is moving of the ground or the surface of water. The surface may comprise a ground surface, or, e.g., a surface of a marine vessel, such as the deck of a still or moving ship.

An exemplary method for controlling the position of a fixed point on an aircraft at a selected azimuth angle, elevation angle and distance above a selected target point on a surface located below the aircraft using the exemplary command and control system of the invention comprises measuring the azimuth angle, elevation angle and distance from the fixed point on the aircraft relative to the selected target point with the camera, measuring the latitude and a longitude of a point on the surface disposed perpendicularly below the fixed point on the aircraft with a navigation system, computing the position of the fixed point on the aircraft relative to the target point on the surface from the respective measurements of the camera and the navigation system with a computer, and controlling the movement of the aircraft such that the fixed point on the aircraft is positioned at the selected azimuth angle, elevation angle and distance above the selected target point on the surface with a controller.

In the exemplary method, the azimuth and elevation angles to the target point are measured by aiming the camera at the target point and measuring the azimuth and elevation angles using the gimbals of the camera. The line-of-sight (LOS) distance from the camera to the target point is measured by the laser rangefinder of the camera in a conventional manner.

In one advantageous application of the system, the aircraft comprises a helicopter, the fixed point comprises a cargo hook on the helicopter, and the exemplary method further comprises positioning the cargo hook immediately above a cargo load disposed on the surface, attaching the load to the cargo hook, and lifting the load off of the surface with the helicopter.

In a related application, the aircraft comprises a helicopter, the fixed point comprises a load carried below the helicopter, and the exemplary method further includes positioning the load immediately above the selected target point on the surface, and detaching the load from the helicopter such that the load is disposed on the surface at the selected target point.

In another advantageous "surveillance" application of the system, the selected target point can be an object moving over the surface, and the exemplary method further comprises maintaining the position of the fixed point on the aircraft at the selected azimuth angle, elevation angle and distance above the moving object.

In yet another "landing" application, the aircraft can be a helicopter, the fixed point can comprises the landing gear of the helicopter, e.g., wheels or skids, and the exemplary method can further comprise positioning the landing gear immediately above the selected target point, and then decreasing the altitude of the helicopter until landing gear engages the surface.

The above exemplary embodiments of the invention provide greater and easier control of helicopters, particularly unmanned helicopters, in a hovering or low-speed environment, and a simple, inexpensive solution for landings on, and operations with cargo-hook loads over, both fixed ground and moving ship platforms, relative to the more complicated and expensive systems of the prior art.

A better understanding of the above and many other features and advantages of the aircraft command and control system of the present invention may be obtained from a consideration of the detailed description of some exemplary embodiments thereof below, particularly if such consideration is made in conjunction with the appended drawings, wherein like reference numerals are used to identify like elements illustrated in one or more of the figures thereof.

DETAILED DESCRIPTION

Figure 1:
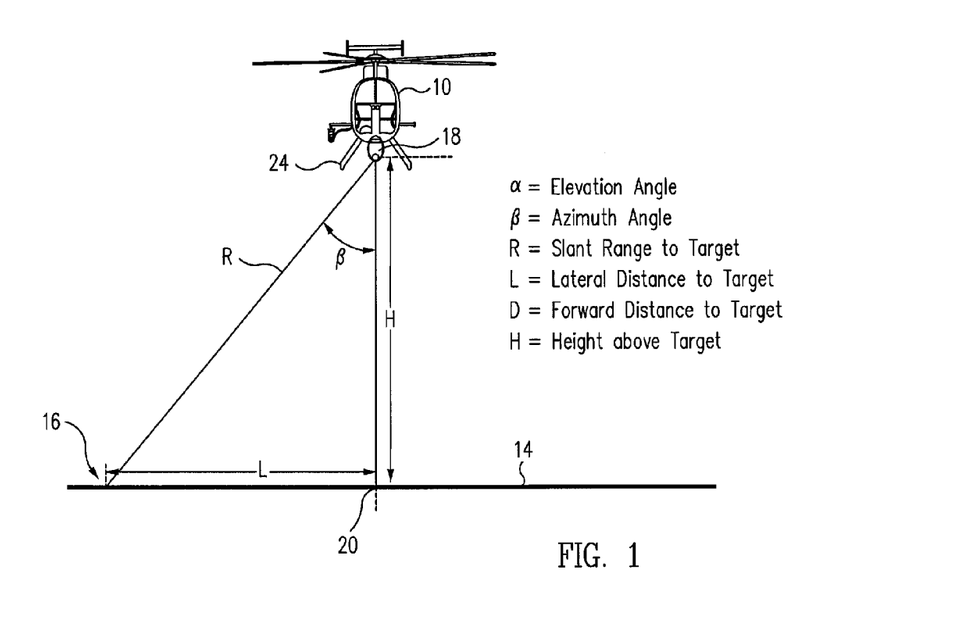
FIG. 1 is a front elevation view of a helicopter equipped with an exemplary embodiment of a command and control system in accordance with the present invention operating over a ground or water surface and relative to a designated target point on the surface.
Figure 2:
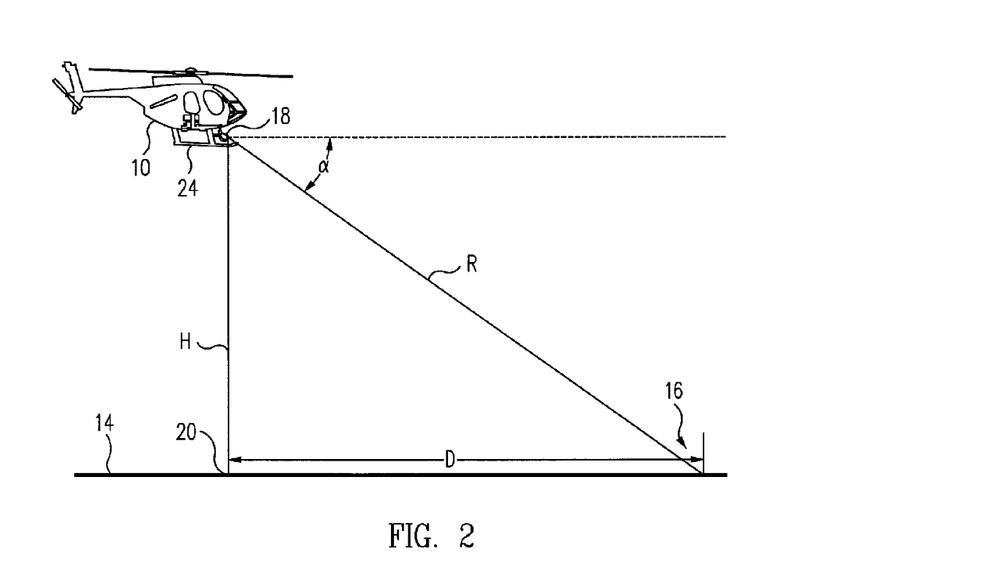
FIG. 2 is a right side elevation view of the helicopter of FIG. 1.

FIGS. 1 and 2 respectively illustrate front and right side elevation views of an aircraft 10, e.g., a helicopter, equipped with an exemplary embodiment of a command and approach control system 12 (see FIG. 5) in accordance with the present invention, shown operating over a ground or water surface 14 and relative to a selected target point 16 located on the surface 14. The helicopter may be manned, e.g., by a pilot, or may be unmanned and controlled by an operator located at a remote command center.

The novel command and control system 12 comprises a camera 18, including a rangefinder, preferably a laser rangefinder, disposed aboard the aircraft 10 for measuring an azimuth angle $\beta$, an elevation angle a and a line-of-sight (LOS) distance, or slant range, from a fixed point on the aircraft relative to the selected target point 16 on the surface 14 below the aircraft, a conventional navigation system (not illustrated) disposed aboard the aircraft for measuring the latitude and longitude of a point 20 on the surface 14 that is disposed perpendicularly below the fixed point on the aircraft, a computer for computing the position of the fixed point on the aircraft relative to the target point from the respective measurements of the camera and the navigation system, and a controller for controlling the movement of the aircraft 10 such that the fixed point on the aircraft is positioned at a selected azimuth angle 1, elevation angle a and slant range above the selected target point 16 on the surface 14.

Figure 3:
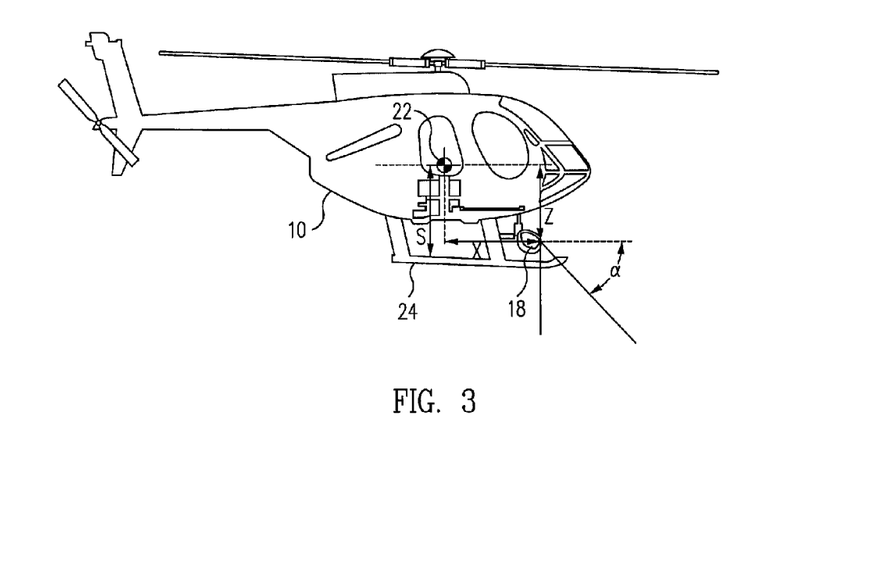
FIG. 3 is a right side elevation view of the helicopter, showing the relative locations thereon of various features of the helicopter relevant to the operation of the command and control system.
Figure 4:
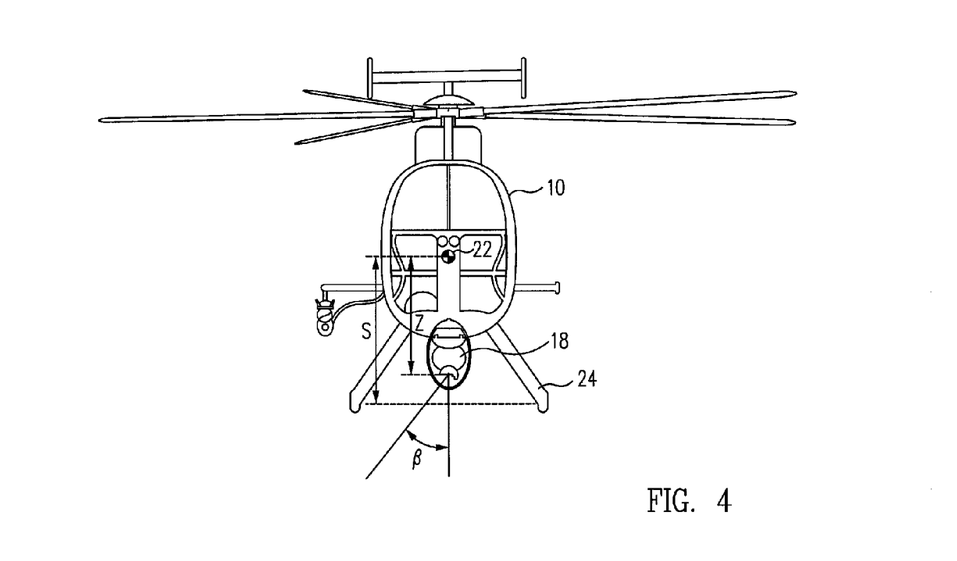
FIG. 4 is a front elevation view of the helicopter of FIG. 3.

Any fixed point on the aircraft 10 may chosen as the desired datum point, e.g., the aircraft's center of gravity (CG) 22 (see FIGS. 3 and 4), its landing gear 24, such as a plurality of wheels or the skids illustrated in the figures, or a cargo load or sling (not illustrated) disposed thereon. The selected target point 16 may comprise, for example, a landing zone on the Earth's surface 14, or a load of cargo (not illustrated) disposed thereon that is to be picked up by the aircraft, or an object (not illustrated) that is moving over the surface 14, such as a car or a ship. The surface 14 may comprise a ground surface, or, e.g., a surface of a marine vessel, such as the deck of a ship, and further, the surface may be still or moving.

Some manned and substantially all unmanned helicopters today are equipped with a gimbaled camera 18 that provides real time video of the helicopter's environment. This camera can be used for search and surveillance using daylight TV and Infrared Imaging. Many such cameras also provide laser pointing, laser designation and laser range-finding capabilities.

In accordance with the present invention, the camera 18 of the command and control system 12 required to provide precision low speed control of the aircraft 10 must have the following capabilities: It must be gimbaled with gimbals that include, e.g., relatively accurate angular-position encoders, so as to provide relatively precise measurements of the azimuth and elevation angles β and α from the selected fixed point on the helicopter 10, such as its CG 22, landing gear 24, or cargo hook disposed below the fuselage of the aircraft, relative to the selected target point 16 on the surface 14 below the aircraft, such as a landing zone, or cargo pickup or drop off point.

The camera 18 must also have a relatively precise rangefinder capability, preferably laser, that provides the LOS distance to the target ground location (or other object) 16 to which it is commanded to point. Thus, the camera provides measurements of range or distance, azimuth, and elevation from the fixed point on the aircraft 10 to a selected target point 16 on the ground or other surface 14. The target point 16 can be one selected by the pilot, in the case of a piloted aircraft, or an operator located at a remote ground station, in the case of an unmanned vehicle, who is in control of the aircraft 10 and camera 18. From the measurements obtained from the camera 18, the location of the selected target point 16 relative to the aircraft 10, or more specifically, to the fixed point on the aircraft, can then be quickly and automatically computed.

The navigation system of the aircraft 10, which may comprise a conventional Global Positioning Satellite (GPS) system or an Inertial Navigation System (INS), or both, operating interactively, in turn, provides the command and control system 12 with the absolute position, i.e., the latitude and longitude, of the aircraft 10 relative to the surface 14, or more precisely, the geographical position of a point 20 on the surface 14 that is disposed perpendicularly below the fixed point on the aircraft 10 (see FIGS. 1 and 2). The GPS/INS location of the selected target point 16 is then determined by adding its distance relative to the aircraft 10, as determined by the range-finder camera 18, to the absolute location 20 of the aircraft 10 relative to the ground 14, as determined by the GPS/INS system(s). The control system of the invention uses this technique to initially define, or to subsequently refine, selected waypoints, which are then used by the automatic flight controller of the system to position the aircraft relative to the selected target point on the ground or other surface in the manner desired.

It should be noted that the absolute accuracy of the GPS/INS position 20 is not critical because it is used for both the definition of the waypoints and the positional feedback used to find position error in the flight command and control system 12. It should also be noted that the relative position of the target point 16 on the ground or other surface 14 is determined in all three dimensions. All three dimensions are crucial to precise control of the aircraft 10 near the ground, but the determination of the vertical dimension H, i.e., the altitude, provides a redundant, relatively precise AGL indication, and thus, obviates dependence on altitude sensors that may be either inoperative or obscured by a load carried externally below the aircraft.

In the case of an unmanned aircraft 10, the command and control system 12 of the invention also defines a remotely located ground station operator interface that enables control of the camera 18, its associated laser range finder, and the aircraft 10 flight control system 12 waypoint commands. The remote ground station operator can thus simply point the camera to any location 16 on a surface 14 located below the aircraft to define a hover point, a landing point, or another reference point relative to which the aircraft's position can be precisely controlled.

FIGS. 1 and 2 illustrate the trigonometric parameters required to determine the position of the selected target point 16 relative to the CG 22 of the aircraft 10, as defined by its latitude, longitude and altitude, and thence, to the relevant fixed point on the aircraft, e.g., the position of its landing gear 24, such as its skids, wheels or a cargo hook. For example, in FIGS. 3 and 4, the camera 18 is shown located a distance X forward of, and Z below, the aircraft's CG, and the aircraft's landing gear 24, comprising a pair of skids, is located a distance S below the CG.

The data required to determine the position of the selected target point 16 on the ground 14 relative to the camera 18 are the azimuth angle β, the elevation angle α and the LOS or slant range to the target point 16, as measured by the camera. With this data, the selected target point relative to the camera, and thence, to the relevant point on the aircraft is precisely determined with a computer, using the following trigonometric relationships.

Measurements from the camera 18:
R=slant range to target
β=Azimuth angle to target (positive is right)
α=Elevation angle to target (positive is up)
Measurements from the GPS/INS:
Θ=Aircraft pitch angle
Φ=Aircraft roll angle
Ψ=Aircraft true heading
Distance to target in the aircraft's body axis frame:

$$\begin{bmatrix} x \\ y \\ z \end{bmatrix} = \begin{bmatrix} R\cos\alpha\cos\beta \\ R\cos\alpha\sin\beta \\ -R\sin\alpha \end{bmatrix}$$

Distance to target in the navigation system frame:

$$\begin{bmatrix} \Delta N \\ \Delta E \\ \Delta D \end{bmatrix} = c_b^n \begin{bmatrix} x \\ y \\ z \end{bmatrix}$$

where:
ΔN=distance North
ΔE=distance East
ΔD=distance Down
and, $$c_b^n = \begin{bmatrix} \cos\Theta\cos\Psi & \sin\Phi\sin\Theta\cos\Psi - \cos\Phi\sin\Psi & \cos\Phi\sin\Theta\cos\Psi + \sin\Phi\sin\Psi \\ \cos\Theta\sin\Psi & \sin\Phi\sin\Theta\sin\Psi + \cos\Phi\cos\Psi & \cos\Phi\sin\Theta\sin\Psi - \sin\Phi\cos\Psi \\ -\sin\Theta & \sin\Phi\cos\Theta & \cos\Phi\cos\Theta \end{bmatrix}$$

The precise altitude of the camera 18 of the aircraft 10 above the target point 16 is then given by:

H=ΔD.

When determined, this altitude can then be adjusted relative to the CG 22 of the aircraft 10 by taking into account the vertical and fore/aft location, or offset, of the camera laser pointer relative to the CG, and then the offsets of the fixed point on the aircraft, e.g., its landing skids 24, relative to the aircraft CG provides the precise desired AGL altitude of the skids above the selected target point 16 on the ground 14. A similar relative positional determination can quickly be computed for any other fixed point on the aircraft, e.g., a cargo hook or load disposed below the fuselage of the aircraft.

Figure 5:
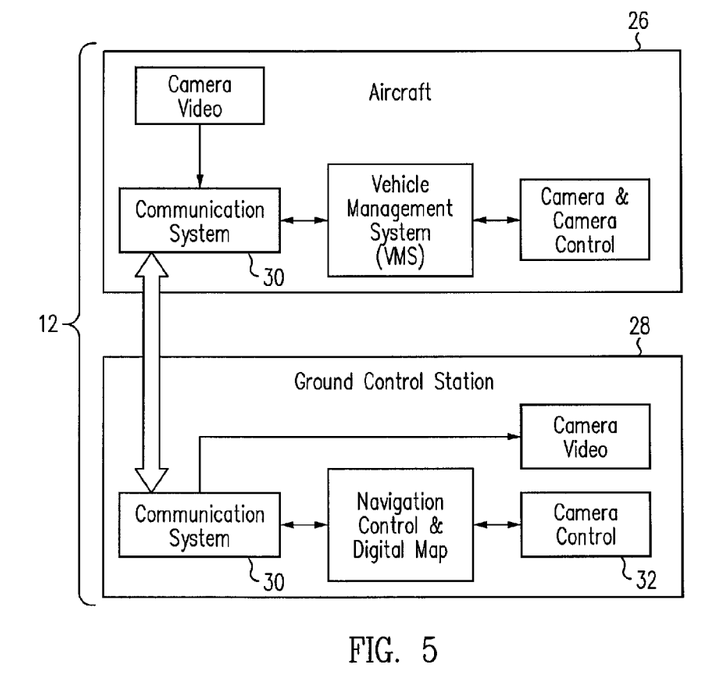
FIG. 5 is a functional block diagram of the exemplary command and control system.

FIG. 5 is a functional block diagram of the major elements of an exemplary embodiment of the command and approach control system 12 in accordance with the present invention. These include a Vehicle Management System (VMS) 26 and a Ground Control Station (GCS) 28. In addition, the system also comprises a communication system 30 for communicating data and control commands between the VMS 26 and the GCS 28, as well as between the airborne camera 18 and the camera control 32 of the GCS 28. As discussed above, in a manned or piloted vehicle, the elements of the system are all integrated aboard the aircraft 10, whereas, in an unmanned aircraft controlled by a remote operator, the elements of the GCS 28 are located remotely from the aircraft at a ground control station (not illustrated), which may be located many hundreds or even thousands of miles from the aircraft's operating location.

Figure 6:
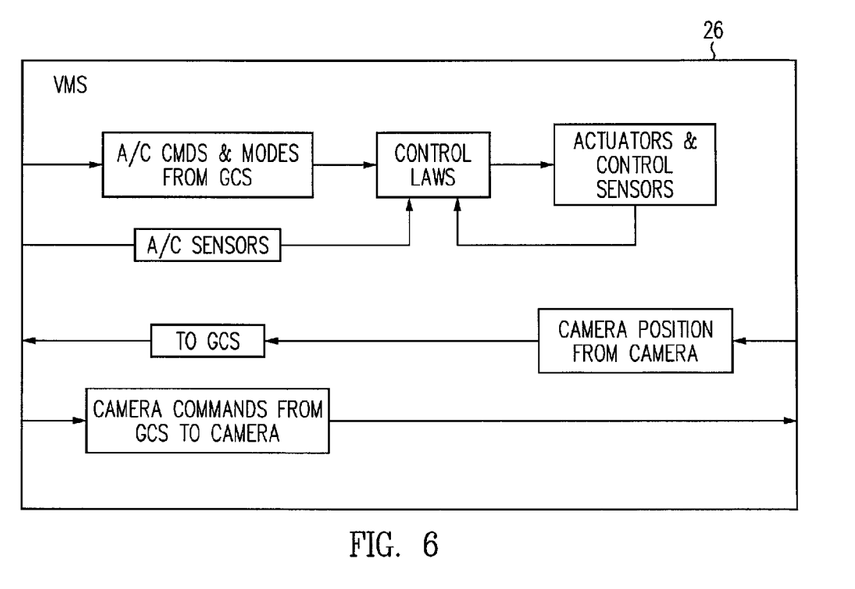
FIG. 6 is more detailed functional block diagram of a Vehicle Management System (VMS) of the command and control system; and, FIG. 7 is a plan view of an exemplary embodiment of a ground station Graphical User Interface (GUI) that may be used by a remote operator of an unmanned helicopter to control the position of the helicopter relative to a point captured by a laser camera and rangefinder of the command and control system.

FIG. 6 is a detailed functional block diagram of the Vehicle Management System (VMS) 26 located aboard the aircraft 10. As may be seen by reference to FIG. 6, the VMS includes a computer and a number of aircraft controllers, as well as actuators and sensors therefor.

As briefly discussed above, one advantageous application of the command and control system 12 of the invention is to define a hovering position of a helicopter 10 relative to a target point 16 on the ground or other surface 14. This can be accomplished in the following manner.

In normal operation, the camera 18 is pointed to a target point 16 on the ground 14, the laser range finder is selected by the operator, and a slant range or distance to the target point 16 is measured with the rangefinder. With the aircraft 10 in a known longitudinal and latitudinal position, and whether moving or hovering, the calculations as described above are effected in a computer of the system and provide the coordinates of the selected target point 16 relative to the desired fixed point on the aircraft, e.g., its CG 22. The ground station operator can then use that position as a hover waypoint, or alternatively, adjust it to a nearby location. The operator then sends the new latitude, longitude and altitude H to the vehicle flight control system 12, together with a command for the aircraft to hover at the selected location. Since the selected target point 16 was determined relative to the aircraft position, its absolute (i.e., relative to the Earth) accuracy is not important. Only the camera gimbals and range errors affect the relative accuracy between the aircraft and the selected hover target point 16. However, if the aircraft's GPS unit includes a differential correction capability, the absolute accuracy of the system will be correspondingly better.

Thus, it may be seen that, in a cargo hook method of operation, the camera 18 can be pointed to a cargo load disposed on the ground or another surface 14, the cargo load pickup point "captured" with the command and control system 12, and an onboard pilot or a remote ground station operator can then command the aircraft 10 using the system to hover over the cargo load using the positional inputs illustrated in FIGS. 1 and 2. The command and control system thus provides a very simple method for the pilot or operator to position the aircraft directly above a cargo load. Even small residual errors in the relative position can be overcome by the operator's ability to adjust the aircraft position command relative to the selected target point 16 "on the fly." The operator simply uses the visual feedback from the camera 18 to adjust the commanded location.

A method of operation of the system 18 for dropping off a cargo load at a precise target point 16 proceeds in a similar manner. Specifically, the selected target point 16 is used as the cargo drop off point, and the vertical distance, or altitude, H of the vehicle 10 is then controlled by the pilot or ground station operator using the control system 12 to easily maneuver the load onto the selected target point, at which point, the load is then disconnected from the fixed point on the aircraft, i.e., its cargo hook, by the issuance of a "release load" command to the system.

Another challenging task for conventional helicopters 10 is to operate closely over and/or land on a moving object, such as a ship. As will be appreciated by those of skill in the art, these operations are even more difficult to effect in the case of an unmanned helicopter. However, if an "eyes-safe" laser range finder is continuously commanded to point to a target point 16 on, e.g., a deck of the moving ship, the aircraft position and velocity relative to the lased point on the ship can then easily be determined using the same techniques described above, thereby enabling the control system 12 to "close the loop" on the target point 16, i.e., landing zone, on the ship and thereby position itself directly over the landing zone.

As may be seen from the foregoing, the system 12 can also be used to assist a pilot or remote operator with operations carried out relative to a moving object, e.g., the deck of a moving ship or a moving ground vehicle. Indeed, with the use of an "auto tracking" capability of some cameras 18, the position of a moving object can tracked automatically by the camera, thus relieving the pilot or remote operator of the task, and thereby providing even better control of the aircraft 10 relative to the moving target point.

For example, in one exemplary method of the invention, the command and control system 12 can be used is a means for maintaining a selected "safe" distance from, e.g., a surveillance helicopter or UAV 10, to a moving object, such as a ground vehicle being tracked by the aircraft. By using the camera's auto tracking and rangefinder capabilities, surveillance of a moving target, such as an automobile, can be performed easily. Thus, the position of the helicopter relative to the moving object can be controlled to place the helicopter at a precise, selected elevation angle, azimuth angle, and LOS distance or slant range that is outside of the range of detection of the moving target vehicle, e.g., by using sun light, moon light and shadows to advantage, and then to keep it there, using the automatic tracking mechanism of the control system.

In another advantageous application of the command and control system 12 of the invention, the system can also be used to help recover an unmanned aircraft 10 during periods in which GPS information is either jammed or otherwise unavailable. During such conditions, the aircraft position will drift over the course of a mission, and a UAV may have difficulty returning to the landing waypoint. By "closing the loop" on the camera azimuth $\beta$ and elevation $\alpha$ to a selected landing zone, landing points 16 can be commanded and controlled without the use of a GPS or during operations in which GPS information is unavailable. If the visually defined landing point has a known latitude, longitude and altitude, it is also possible to feed back the known landing zone information (i.e., latitude, longitude and altitude) defined by the camera 18 to correct the aircraft's INS position and thereby lower the drift rate of the inertial system.

The accuracy of the command and control system 12 is generally a function of the accuracy of the laser range finder of the camera 18 and the azimuth and elevation angle measuring mechanisms thereof. When flying to a target landing zone using the laser range finder at relatively long range distances, the target location error may be larger. The laser range finder may therefore be used several times during an approach to provide updated capture points and to improve the solution as the aircraft 10 approaches the landing zone.

However for laser range finder distances that are relatively short (e.g., less than about 200 feet) the camera azimuth and elevation angle accuracies are less important.

Existing camera technology is sufficient to provide the camera 18 azimuth β and elevation angles α required by the system 12 of the invention. While current "eye-safe" laser range finders do not have very good accuracy at relatively close ranges, and in fact, may not work at distances of less than about 100 feet, the aircraft 10 approach command and control system 12 of the present invention nevertheless enables a pilot or remote ground station operator to precisely position, e.g., a helicopter, over a selected target point 16 on a surface 14, such as a landing zone or cargo load. With better, shorter-distance laser range finders, the precision of the camera pointing location will be correspondingly improved, and the accuracy of initial landing locations will likewise improve with fewer adjustments being required by the pilot or ground station operator.

Figure 7:
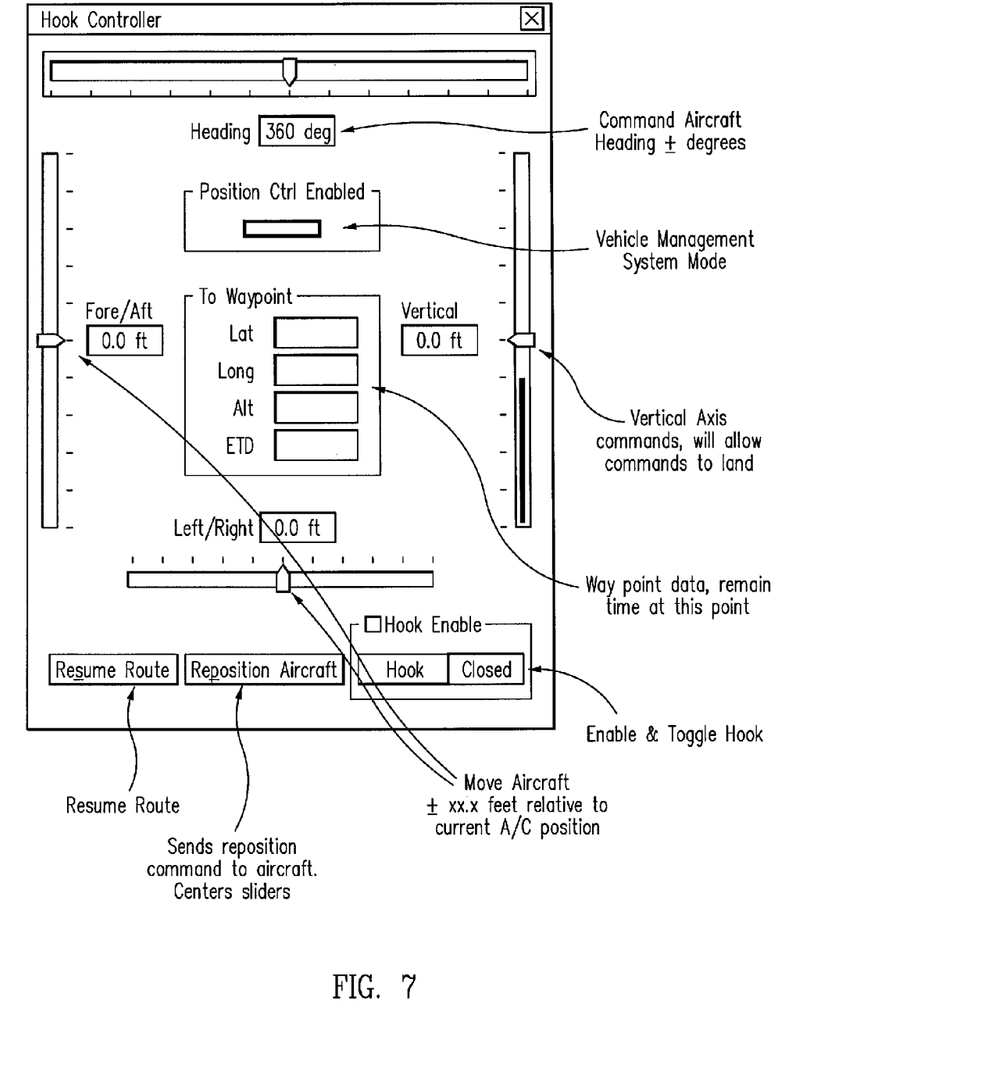

FIG. 7 is plan view of an exemplary embodiment of a Ground Station Graphical User Interface (GUI) that can be displayed on a display panel of the system and used by the remote operator of an unmanned helicopter 10 to adjust the position of the helicopter relative to a point captured by a laser. Several types of such interfaces can be used, depending on the particular mission to be accomplished. The particular exemplary embodiment illustrated may be used, for example, when controlling the helicopter to a landing zone, a cargo pick up or a cargo drop point. The distances indicated in this interface can be displayed in any units that are useful and meaningful to the ground station operator. In the particular embodiment illustrated, distances are displayed in increments of a tenth of a foot.

By now, those of skill in this art will appreciate that many modifications, substitutions and variations can be made in and to the methods and apparatus of the aircraft command and approach control system of the present invention without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. An aircraft command and control system, comprising:
    a camera, including a rangefinder, disposed aboard the aircraft for measuring an azimuth angle, an elevation angle and a slant range from a fixed point on the aircraft relative to a selected target point on a surface located below the aircraft;
    a navigation system disposed aboard the aircraft for measuring a latitude and a longitude of a point on the surface that is disposed perpendicularly below the fixed point on the aircraft;
    a computer for computing the position of the fixed point on the aircraft relative to the target point on the surface from the respective measurements of the camera and the navigation system; and,
    a controller for controlling the movement of the aircraft such that the fixed point on the air craft is positioned at a selected azimuth angle, elevation angle and slant range above the selected target point on the surface,
    wherein the camera is supported on gimbals, and wherein the gimbals of the camera are used to measure the azimuth and elevation angles to the target point.

2. The system of claim 1, wherein the rangefinder of the camera comprises a laser rangefinder.

3. The system of claim 1, wherein the navigation system comprises a Global Positioning Satellite (GPS) system, an Inertial Navigation System (INS), or both a GPS and an INS.

4. The system of claim 1, wherein the aircraft comprises a helicopter or an aerial vehicle.

5. The system of claim 1, wherein the aircraft is unmanned.

6. The system of claim 5, wherein the aircraft is controlled from a ground control station remote from the aircraft.

7. The system of claim 6, further comprising a Graphical User Interface (GUI) useable by an operator of the aircraft for controlling the position of the aircraft relative to the target point.

8. The system of claim 5, wherein the surface comprises a surface of a marine vessel.

9. The system of claim 8, wherein the marine vessel is moving.

10. The system of claim 1, wherein the target point comprises an object moving on the surface, and further comprising a tracking mechanism for automatically maintaining the position of the fixed point on the aircraft at the selected azimuth angle, elevation angle and slant range above the moving object.

11. A method for controlling the position of a fixed point on an aircraft at a selected azimuth angle, elevation angle and slant range above a selected target point on a surface located below the aircraft, the method comprising:
    providing the aircraft with the command and control system of claim 1; and,
    controlling the position of the fixed point on the aircraft relative to the target point with the command and control system.

12. A method for maintaining an aircraft at a selected slant range above an object moving over a surface, the method comprising:
    providing the aircraft with the command and control system of claim 1;
    controlling the aircraft with the command and control system such that the fixed point on the aircraft is disposed at the selected slant range above the moving object; and,
    controlling the movement of the aircraft with the command and control system such that the aircraft remains at the selected slant range above the moving object.

13. A method for picking up a cargo load disposed on a surface with a helicopter, the method comprising:
    providing the helicopter with the command and control system of claim 1;
    positioning a cargo hook on the helicopter immediately above the load using the command and control system;
    attaching the load to the cargo hook; and,
    lifting the load off of the surface with the helicopter.

14. A method for dropping off a cargo load carried on a cargo hook below a helicopter at a selected target point on a surface, the method comprising:
    providing the helicopter with the command and control system of claim 1;
    positioning the load immediately above the selected target point using the command and control system; and,
    detaching the load from the hook such that the load is disposed at the selected target point on the surface.

15. A method for landing a helicopter at a selected target point on a surface, the method comprising:
    providing the aircraft with the command and control system of claim 1; and,
    positioning landing gear of the helicopter immediately above the target point with the command and control system; and, decreasing the altitude of the helicopter until the landing gear engages the surface.

16. A method for controlling the position of a fixed point on an aircraft at a selected azimuth angle, elevation angle and slant range above a selected target point on a surface located below the aircraft, the method comprising:
measuring an azimuth angle, an elevation angle and a slant range from the fixed point on the aircraft relative to the selected target point with a camera having a rangefinder;
measuring a latitude and a longitude of a point on the surface that is disposed perpendicularly below the fixed point on the aircraft with a navigation system;
computing the position of the fixed point on the aircraft relative to the target point on the surface from the respective measurements of the camera and the navigation system with a computer; and,
controlling the movement of the aircraft such that the fixed point on the aircraft is positioned at the selected azimuth angle, elevation angle and slant range above the selected target point on the surface with a controller,
wherein the camera is supported on gimbals, and wherein the measuring of the azimuth and elevation angles to the target point comprises:
aiming the camera at the target point; and,
measuring the azimuth and elevation angles using the gimbals of the camera.

17. The method of claim 16, wherein the aircraft comprises a helicopter and the fixed point comprises a cargo hook on the helicopter, and further comprising:
positioning the cargo hook immediately above a cargo load disposed on the surface;
attaching the load to the cargo hook; and,
lifting the load off of the surface with the helicopter.

18. The method of claim 16, wherein the aircraft comprises a helicopter and the fixed point comprises a load carried below the helicopter, and further comprising:
positioning the load immediately above the selected target point on the surface; and,
detaching the load from the helicopter such that the load is disposed on the surface at the selected target point on the surface.

19. The method of claim 16, wherein the selected target point is an object moving over the surface, and further comprising:
maintaining the position of the fixed point on the aircraft at the selected azimuth angle, elevation angle and slant range above the moving object.

20. The method of claim 16, wherein the aircraft is a helicopter and the fixed point comprises a landing gear of the helicopter, and further comprising:
positioning the landing gear immediately above the selected target point; and,
decreasing the altitude of the helicopter until the landing gear engages the surface at the selected target point.

21. An improved precision approach control system for an aircraft of a type incorporating a navigation system comprising at least one of a Global Positioning Satellite (GPS) system and an Inertial Navigation System (INS), wherein the improvement comprises:
a camera, including a rangefinder, disposed aboard the aircraft for measuring an azimuth angle, an elevation angle and a slant range from a fixed point on the aircraft relative to a selected target point on a surface located below the aircraft; and,
a computer for computing the position of the fixed point on the aircraft relative to the target point on the surface from the respective measurements of the camera and the at least one navigation system,
wherein the camera is supported on gimbals, and wherein the gimbals of the camera are used to measure the azimuth and elevation angles to the target point.

22. The system of claim 21, wherein the improvement further comprises a controller for controlling the movement of the aircraft such that the fixed point on the aircraft is positioned at a selected azimuth angle, elevation angle and slant range above the selected target point on the surface.

23. The system of claim 22, wherein the controller includes a tracking mechanism for automatically maintaining the position of the fixed point on the aircraft at the selected azimuth angle, elevation angle and slant range above the moving object.

* * * * *